United States Patent [19]
Kegelman

[11] 3,855,006
[45] Dec. 17, 1974

[54] HIGH ENERGY DENSITY BATTERY HEAT FUSIBLE VENTING MEANS

[75] Inventor: Matthew Roland Kegelman, Wilmington, Del.

[73] Assignee: E. I. du Pont de Nemours and Company, Wilmington, Del.

[22] Filed: Aug. 1, 1973

[21] Appl. No.: 384,500

Related U.S. Application Data
[63] Continuation-in-part of Ser. No. 180,379, Sept. 14, 1971, abandoned.

[52] U.S. Cl. .............................................. 136/177
[51] Int. Cl. ............................................ H01m 1/06
[58] Field of Search ............... 136/177, 133, 100 M; 116/114.5; 220/44 R

[56] References Cited
UNITED STATES PATENTS

| | | | |
|---|---|---|---|
| 2,144,959 | 1/1939 | Blackburn | 136/133 |
| 2,282,459 | 5/1942 | Deeley | 136/78 |
| 2,306,409 | 12/1942 | Reuben | 136/100 M |
| 2,431,110 | 11/1947 | Clair | 116/114.5 |
| 3,669,302 | 6/1972 | Markarian | 220/44 R |

Primary Examiner—Winston A. Douglas
Assistant Examiner—H. A. Feeley
Attorney, Agent, or Firm—Donald W. Huntley

[57] ABSTRACT

High energy density batteries can be protected against violent rupture due to overheating cause by either external or internally produced heat by incorporating in the battery case electrolyte expulsion vents sealed with heat fusible material which melts at a temperature below that necessary to produce extreme internal pressure.

4 Claims, 1 Drawing Figure

PATENTED DEC 17 1974
3,855,006
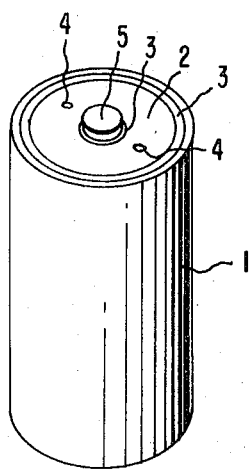
INVENTOR
MATTHEW ROLAND KEGELMAN
BY John R. Powell
ATTORNEY

HIGH ENERGY DENSITY BATTERY HEAT FUSIBLE VENTING MEANS

CROSS-REFERENCE TO RELATED APPLICATION

This is a Continuation-in-Part of copending application Ser. No. 180,379, filed Sept. 14, 1971 now abandoned.

BACKGROUND OF THE INVENTION

Prior battery pressure venting mechanisms such as the one disclosed in U.S. Pat. No. 3,494,802 to L. F. Urry are designed to vent gas generated internally during the discharge of the cell. Other venting means consist of open diffusion vents of one type or another.

High energy density batteries are characterized by their employment of anodes of active metals such as lithium or sodium, non-aqueous solvents, electrolytes having high oxidative power and cathodes of metal oxides or sulfides. Such batteries when shorted are subject to rapid reaction of all components such as the organic solvent for the electrolyte with oxidizing agents such as cathode depolarizers and electrolyte solutes such as perchlorates, resulting in extremely rapid temperature and pressure increases.

Due to the active nature of the anode materials in high energy density batteries, it is necessary that the battery be air-tight to prevent degradation of the active anode material. Conventional pressure venting means do not result in adequate sealing.

SUMMARY OF THE INVENTION

The instant invention provides, in a galvanic battery comprising a lithium anode, a depolarizing cathode in an oxidation state high in relation to lithium and an electrolyte comprising a combustible organic solvent and a solute enclosed in an atmospherically sealed battery case, the improvement comprising at least one electrolyte expulsion vent incorporated into the sealed battery case having a thermally fusible metal vent plug that melts at a preselected temperature below the temperature at which the battery case would violently rupture due to heat and pressure, whereby the electrolyte is vented from the battery case.

BRIEF DESCRIPTION OF THE DRAWING

The drawing shows a perspective view of a battery having fusible plugs.

DESCRIPTION OF THE INVENTION

Batteries can become overheated due to either internal or external causes. Accidental fires or extreme and unusual storage conditions may result in high external temperatures which can initiate both chemical reaction and high vapor pressure of electrolyte solvent within the battery. Accidental internal or external shorting can occur due to errors in assembly or use of the batteries. High energy density batteries, which employ materials of known high chemical activity, offer new problems due to the possibilities for intense chemical reaction and sudden development of heat and pressure inherent in the use of these materials.

In the event of short circuiting within or outside of the battery, sufficient heat can be generated via exothermic electrochemical reaction to initiate a sudden, excessively exothermic chemical reaction which could result in violent rupture of the battery casing. Provision of heat sensitive sealed electrolyte expulsion vents allows the expelling of the electrolyte from the battery, thus interrupting the exothermic electrochemical reaction. In this way the hazard of a violent rupture of the battery is avoided, as venting of the electrolyte both cools the battery and removes one of the elements necessary for propagation of the heat producing electrochemical reaction.

Employment of a temperature sensitive safety device rather than one sensitive to pressure is uniquely appropriate in high energy density primary batteries. Higher temperature usually precedes development of pressure, thus response to heat is quicker than response to pressure. The small size, compact nature and high thermal conductivity of these batteries insure that no appreciable lag occurs in transmittance of heat from origin to any point on the casing. We are considering here batteries of "D" size or smaller.

With reference to the drawing a high energy density battery having the configuration of a cylinder is enclosed in a steel, cupped, cylindrical case 1 having a metal cap 2 that is insulated from the case 1 by a tight fitting plastic ring gasket 3. The steel cylindrical case 1 provides the anode contact for the cell, while a center button 5 in the cap 2 operatively connected to the cathode inside the battery provides the cathode contact. Electrolyte expulsion vents 4 are provided by drilling or punching holes in the metal cap 2 and filling them with a heat fusible material that melts at a lower temperature than the other battery parts. The vents 4 can be placed anywhere on the metallic cap 2 or the metallic case 1.

Development of even modest pressure will blow substantially all of the electrolyte out through the open vents as a mixture of vapor and liquid regardless of where the vents are located on the case.

The heat fusible material can be introduced into the vent 4 by conventional means, such as dipping or deposition, with liquid such that it fills the vent holes 4 and then cooling to allow the heat fusible material to solidify.

When the battery becomes overheated from either internal or external sources, the heat fusible material in the vents 4 melts and the liquid electrolyte inside is expelled by heat and pressure through the vents holes 4.

Due to the extremely rapid and exothermic nature of the decomposition reaction of the battery components, the skin temperature of the battery may lag as much as about 35°C., the internal temperature of the battery during such accidental overheating. It is thus necessary that the heat fusible material melt at a temperature considerably below the internal temperature. In smaller batteries such as D size or smaller, fusible material melting at a temperature of from about 60° to about 100°C., preferably from about 70° to about 95°C., can be used effectively.

Heat fusible material useful in this invention include relatively low melting metals alloys, and polymers such as polyethylene or polypropylene of appropriate melting point. The most preferred materials include "Neylo" metal alloys, commercially available from Ney Metals, Inc., 269 Freemon St., Brooklyn, N.Y. 11222 and known fusible alloys such as Lipowitz alloy and Wood's metal.

It will, of course, be recognized that in larger sized batteries an even more pronounced internal versus external heat lag may occur, requiring the use of alloys melting at temperatures outside the range for smaller batteries.

This invention is applicable broadly to electrolytic cells and batteries involving combustible materials such as organic electrolyte solvents in contact with thermally activated oxidizers therefor, such as cathode depolarizers and electrolyte solutes in relatively high oxidation states. Conventional electrolyte solvents include inorganic materials such as ammonia or sulfur dioxide, saturated aliphatic amines, cyclic ethers and esters, acetonitrile, dimethylformamide, nitromethane and others. In many cases mixed solvents are used.

A large number of electrolyte solutes has also been disclosed for batteries of this type, including salts of general formula $MM'F_6$, $MSCN$ and $MClO_4$ where M is a cation of lithium, sodium or potassium and M' is phosphorus, arsenic or antimony. Especially useful is lithium perchlorate. It will be recognized that the metal perchlorates are potential oxidizers of organic material.

Applicable cathode depolarizers include oxides, halides, nitrates and sulfides of iron, copper, nickel, silver, cobalt and chromium. These cathode materials all exist in an oxidation state that is high in relation to the anode material.

The material used as plugs for the casing vents must of course not be attacked by the electrolyte or other materials and products of the operating cell.

EXAMPLE

More specifically, in a battery configuration like that shown in FIG. 1, three 3/64 inch holes were drilled on a ¼ inch diameter circumference in a thin stainless steel plate shaped to fit a cap of a "C" size high energy density battery casing. The holes were smoothed by gentle abrasion and a little solder flux (Kester Flux 817) applied to the area of the holes. The drilled metal plate was placed on a carbon sheet and a drop of molten alloy was placed over each hole from a small glass tube. Excess molten alloy was sucked up in the glass tube using a rubber bulb to provide suction. The carbon sheet is not wetted by the alloy, thus the alloy stays in the holes where it cools and solidifies.

These batteries employed cathodes prepared as follows: Each of a pair of cylindrical steel rollers 5 inches in diameter was provided on its periphery with axially extending peaked ridges spaced 0.125 inches apart, each ridge being 0.012 inches high and 0.020 inches wide at its base. The rollers were juxtaposed so that the ridges of each roller would meet at close proximity so that sheet material moving between them would be grooved to 0.044 inches thick at its minimum thickness. A continuous strip of expanded nickel grid about 0.010 inches thick, made by drawing apart slitted 0.005 inch nickel sheet to produce a grid having at least 90 percent voids was fed between the rollers at the peripheral speed of the roller ridges. Flowing particles, about 300 mesh size, of the reaction mix of two parts copper and one part sulfur were metered into the space where the roller ridges approached each other. The particle flow was on only one side of the grid but immediately filled the spaces on both sides of the grid.

The grid and particles passed between the rollers through the nip of opposing ridges, and left the nip as rigid masses of compressed particles in slot configuration on the grid material. The strip was heated to about 200°C. over about 1 hour and held under reduced pressure at 200°C. for an additional hour to remove volatile material, then cooled.

When the product strip was cut to a width providing slats 1.625 inches long, it could be used in rolled C size cells.

C size cells were prepared by preparing a composite roll with an inner surface using 7½ inches of above prepared cathode material, a second layer comprising nonwoven polypropylene tape, a third layer of pressed lithium about 28 mils in thickness and a final layer of polypropylene tape. The composite roll was placed in a cylindrical cupped steel shell of suitable size for a close fit, and an electrolyte comprising tetrahydrofuran, ethylene glycol dimethyl ether and about 10 percent lithium perchlorate added. The cell was closed at the end in known manner, and was then available for use.

A thermocouple was soldered to each of 4 such battery casings and temperature changes followed on a remotely located meter. The low melting alloys used melted at 75°C. as applied to two of the batteries and at 92°C. as applied to the other two. The alloys were prepared from standard recipes — 52% bismuth, 40% lead and 8% cadmium for the 92°C. melting material, and 50% bismuth, 27% lead, 13% tin and 10% cadmium for the 75°C. melting material. After assembly and attachment of the thermocouple, in order to simulate a possible accidental short under storage or service conditions, each battery was intentionally shorted by running a copper wire from the anodic casing to the cathodic contact. In the case of the batteries utilizing 75°C. melting safety plugs, the maximum temperature shown on the casing was 70°C. in one case and 98°C. in the other. In the second case the vent holes had become partially plugged with the battery contents as the electrolyte was ejected. In both cases the temperature dropped rapidly after the maximum was reached and the electrolyte expelled.

With the batteries utilizing the 92°C. melting safety plugs the maximum temperature reached was 104°C. in one case and 108°C. in the other. In each case the electrolyte was expelled rapidly but without flame or explosion.

In contrast, when cells of the same composition but without vents were shorted in the same manner, the batteries ruptured violently at a recorded temperature of 120°C.

I claim:

1. In a galvanic battery comprising a lithium anode, a depolarizing cathode in an oxidation state high in relation to lithium and an electrolyte comprising a combustible organic solvent and a solute enclosed in an atmospherically sealed battery case, the improvement comprising at least one electrolyte expulsion vent incorporated into the sealed battery case having a thermally fusible metal vent plug that melts at a preselected temperature below the temperature at which the battery case would violently rupture due to heat and pressure, whereby the electrolyte is vented from the battery case.

2. A battery of claim 1 in which the electrolyte solvent is a saturated aliphatic amine, a cyclic ether, a cyclic ester, acetonitrile, dimethylformamide, nitromethane or their mixtures and the solute is a salt of the formula $MM'F_6$, $MSCN$, or $MClO_4$ wherein M is a lithium, sodium or potassium cation and M' is a phosphorus arsenic or antimony cation.

3. A battery of claim 1 in which the fusible material melts at from about 60° to about 100°C.

4. A battery of claim 1 in which the fusible material melts at from about 70° to about 95°C.

* * * * *